(12) United States Patent
Kern

(10) Patent No.: US 9,144,759 B2
(45) Date of Patent: Sep. 29, 2015

(54) SEPARATORLESS PLEATED FLUID FILTER

(75) Inventor: Charles Francis Kern, Marietta, OH (US)

(73) Assignee: Johns Manville, Denver, CO (US)

( * ) Notice: Subject to any disclaimer, the term of this patent is extended or adjusted under 35 U.S.C. 154(b) by 595 days.

(21) Appl. No.: 13/028,646

(22) Filed: Feb. 16, 2011

(65) Prior Publication Data

US 2012/0205323 A1 Aug. 16, 2012

(51) Int. Cl.
| | |
|---|---|
| B01D 39/00 | (2006.01) |
| B21D 35/00 | (2006.01) |
| B32B 37/02 | (2006.01) |
| B32B 37/06 | (2006.01) |
| B01D 46/52 | (2006.01) |
| B01D 29/56 | (2006.01) |
| B01D 29/11 | (2006.01) |
| B01D 29/23 | (2006.01) |
| B01D 29/33 | (2006.01) |
| B01D 29/58 | (2006.01) |
| B01D 46/00 | (2006.01) |

(52) U.S. Cl.
CPC .............. *B01D 29/56* (2013.01); *B01D 29/111* (2013.01); *B01D 29/232* (2013.01); *B01D 29/333* (2013.01); *B01D 29/58* (2013.01); *B01D 46/0001* (2013.01); *B01D 46/0023* (2013.01); *B01D 46/523* (2013.01); *B01D 2201/12* (2013.01); *Y10T 29/49906* (2015.01)

(58) Field of Classification Search
USPC ............ 210/167.3, 493.5, 493.1, 806, 493.3; 264/257, 258, 286, 287; 425/336, 343, 425/385, 394, 396; 55/486, 488, 497, 521
See application file for complete search history.

(56) References Cited

U.S. PATENT DOCUMENTS

| | | | | |
|---|---|---|---|---|
| 3,531,920 | A | | 10/1970 | Hart |
| 5,064,598 | A | * | 11/1991 | Seiler ............................ 264/230 |
| 6,716,361 | B2 | * | 4/2004 | Deibel et al. .................. 210/797 |
| 7,323,105 | B1 | * | 1/2008 | Janikowski et al. ........ 210/493.1 |
| 7,625,417 | B2 | * | 12/2009 | Yang ................................ 55/487 |
| 2003/0106295 | A1 | * | 6/2003 | Beer et al. ....................... 55/486 |
| 2004/0163783 | A1 | * | 8/2004 | Muller .......................... 162/132 |
| 2008/0315465 | A1 | * | 12/2008 | Smithies et al. .............. 264/466 |

FOREIGN PATENT DOCUMENTS

EP 0 429 805 A1 6/1991

* cited by examiner

*Primary Examiner* — Bobby Ramdhanie
*Assistant Examiner* — Patrick Orme
(74) *Attorney, Agent, or Firm* — Robert D. Touslee

(57) ABSTRACT

A fluid filter media including a first media layer, a second media layer, a filter layer disposed between the first media layer and the second media layer, and a plurality of spaced apart weld points that couple the first media layer, the filter layer, and the second media layer together, where the weld points distort the surface of the first media layer and the second media layer, the fluid filter media is folded back on itself to form a plurality of pleats, and the surface distortions permit fluid flow through the fluid filter media when adjacent surfaces of the fluid filter media touch.

18 Claims, 4 Drawing Sheets

SEPARATORLESS PLEATED FLUID FILTER

BACKGROUND OF THE INVENTION

The subject invention relates generally to fluid filter media products and more specifically to fluid filter media products comprising a pleated fluid filter medium.

Fluid Filters are used in a variety of applications to remove particulates and debris (i.e., contaminants) from fluids. For example, fluid filters are commonly used in machinery (e.g., vehicles, engines, etc.) to filter oil, gas, air, and/or other fluids. For example, most vehicles (e.g., cars, trucks, tractors, etc.) contain an oil filter, gas filter, transmission filter, and air filter that remove contaminants from the oil, gas, transmission fluid, and air. Industrial equipment (e.g., compressors, hydraulics, vacuums, purifiers, etc.) often use fluid filters as well to remove contaminants and/or to purify fluids.

Fluid filters often include a filter medium that is placed in the fluid stream or fluid path so that the fluid is forced to flow through (i.e., pass through) the filter medium. The filter medium may be made of a porous or semi porous material that entraps and sequesters suspended contaminants as the fluid passes through the filter medium. The porosity and/or permeability of the filter medium may be varied depending on the application and/or the size of the particles/contaminant to be filtered. For example, in applications that require virtually contaminant free fluids, the filter medium may be constructed to filter very fine particles. In applications where filtering very fine particles is less of a concern, the filter medium may be constructed to only filter larger particles. Because the fluid is forced to flow/pass through the filter medium, a pressure drop normally exists across the filter medium. The pressure drop across the filter medium may depend on the size and/or type of particle/contaminant to be filtered, with finer particle/contaminant filtering resulting in an increased pressure drop.

The amount of fluid that can be filtered by a fluid filter in a given amount of time and pressure depends on several factors including the surface area of the filter medium. Generally, as the surface area of the filter medium increases, the more fluid the filter is able to filter in a given amount of time. Similarly, over time, the increase of the pressure drop across a filter medium is generally reduced as the surface area increases due to an increased ability to filter particles without becoming saturated. Thus, the lifespan of the fluid filter is also increased because the filter is able to filter more fluid before becoming saturated with filtered contaminants/particles and exceeding the pressure drop limits. However, the surface area of the filter medium is often limited by the volume that the fluid filter may occupy. To increase a filter medium's surface area for a given volume, the filter medium may be pleated by bending the filter medium back on itself several times.

A problem associated with pleating the filter medium is that adjacent pleats may collapse, or in other words, the surfaces of adjacent pleats may touch. Adjacent pleats may collapse due to the pressure drop across the filter medium and/or due to prolonged use. Pleat collapsing generally may increase over the life of the fluid filter due to pressure drop increases due to media loading. Pleat collapsing often restricts or eliminates fluid flow through the collapsed area of the filter medium, which may result in an additional increased pressure drop across the filter medium and/or in a failure of the fluid filter to properly filter a fluid (e.g., the fluid filter does not filter a sufficient amount of fluid in a given amount of time).

High performance (e.g., finer particle/contaminant filtering) and/or long life fluid filters often require greater filtration efficiency and higher dirt loading properties, which means that an increased number of pleats may be required when compared to similar lower quality filters. Such high quality filters may experience a greater risk of pleat collapsing due to the increased number of pleats and/or due to the reduced spacing between the pleats. In addition, high quality filters are often subjected to increased pressure drops due to finer particle filtration, which may further increase the risk of pleat collapsing.

To reduce the pleat collapsing problem, a separator may be applied between the pleats on either or both the upstream side and downstream side of the filter medium. The separator may be a thin strip or bead of glue applied between the pleats (e.g., hot melt glue beads), crimps in the filter medium, nylon mesh or screen applied to the filter medium, etc. The need for separators may increase as the risk of pleat collapsing increases. Adding separators to fluid filters, however, often increases the manufacturing time, manufacturing costs, and/or material costs of the fluid filter. Additionally, adding an extra layer to act as separators in the pleat configuration takes up media space, thus reducing the number of pleats in the filter or requiring an increase in the filter element size. In addition, pleat collapsing may still occur despite the use of a pleat separator.

BRIEF SUMMARY OF THE INVENTION

The present invention provides fluid filters that are capable of filtering a fluid to entrap or sequester contaminants. The present invention also provides methods for filtering fluids with a fluid filter. According to one embodiment the present invention, a fluid filter may include a first media layer, a second media layer, a filter layer disposed between the first media layer and the second media layer, and a plurality of spaced apart weld points that couple the first media layer, the filter layer, and the second media layer together to form the fluid filter. The weld points may distort the surface of the first media layer and the second media layer, the fluid filter may be folded back on itself to form a plurality of pleats in the fluid filter, and the surface distortions may permit fluid flow through the fluid filter when adjacent surfaces of the fluid filter are touching.

According to another embodiment of the present invention, a filter medium may include a first media layer, a second media layer, and a plurality of spaced apart weld points that couple the first media layer and the second media layer together to form the filter medium. The weld points may distort the surface of the first media layer and/or the second media layer. In addition, the filter medium may be folded back on itself to form one or more pleats in the filter medium. Furthermore, the surface distortions may permit fluid flow through the filter medium when adjacent surface of the filter medium are touching. The filter medium may also include a third media layer that is disposed between the first media layer and the second media layer. The first, second, and/or third media layer may filter particles/contaminants from a fluid passed therethrough.

The filter medium may be assembled with a container having an open end, a closed end, and an interior to form a fluid filter product. The filter medium may be positioned within the interior of the container. Similarly, the container and/or filter medium may be generally cylindrical and may be assembled in an axially aligned relationship. The first media layer and/or second media layer may be dimpled at each of the plurality of weld points so that the dimpled first media layer and/or second media layer create fluid pathways through the filter medium when adjacent surfaces of the filter medium are touching. Similarly, one or more dimples from a first surface may overlap with one or more dimples from a second surface when adjacent surfaces of the filter medium are touching to create a fluid pathway through the filter medium. In addition, the filter medium may not include a separator to separate adjacent surfaces of the filter medium.

According to a further embodiment, a method of making a filter medium that removes one or more particles from a fluid passed through the filter medium may include providing a first media layer, providing a second media layer, providing a filter layer, positioning the filter layer between the first media layer and the second media layer, coupling the first media layer with the second media layer at a plurality of spaced apart weld points to form the filter medium, and folding the filter medium back on itself to form a plurality of pleats in the filter medium. The weld points may distort the surface of the first media layer and the second media layer and the surface distortions may permit fluid flow through the filter medium when adjacent surfaces of the filter medium are touching. The pleated filter medium may be formed to be hollow and cylindrical shape with the first media layer on the exterior of the cylindrical filter medium and the second media layer on the interior of the cylindrical filter medium and the method may further include providing a cylindrical container having an interior, an open end, and a closed end, and assembling the cylindrical container with the cylindrical filter medium by axially aligning the cylindrical container and the cylindrical filter medium and by positioning the cylindrical filter medium within the interior of the cylindrical container.

According to an additional embodiment, a method of filtering a fluid may include providing a filter media and passing the fluid through the filter media to remove one or more particles from the fluid. The filter media may have a first media layer, a second media layer, a filter layer disposed between the first media layer and the second media layer, and a plurality of spaced apart weld points that couple the first media layer, the filter layer, and the second media layer together to form the filter media. The weld points may distort the surface of the first media layer and the second media layer, the filter media may be folded back on itself to form a plurality of pleats in the filter media, and the surface distortions may permit the fluid to flow through the filter media when adjacent surfaces of the filter media are touching.

DETAILED DESCRIPTION OF THE INVENTION

Figure 1A:
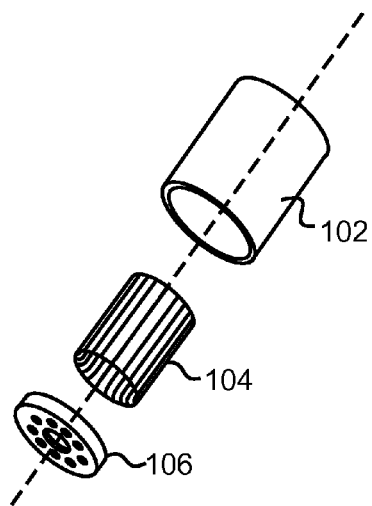
FIG. 1A is a schematic perspective view of a fluid filter product including a container, a filter medium, and a cap according to one embodiment of the present invention.

The present invention provides a fluid filter medium that when made into a filter device, filters one or more fluids to remove particles and debris (i.e., contaminants) from the fluid as the fluid is passed through the fluid filter medium. The fluid filter medium may include a housing or container in which the filter medium is positioned. The filter medium may include a first media layer and a second media layer. Additionally, the filter medium may include a third media layer disposed between the first and second media layers. The first and/or second media layers may be constructed of stiff or rigid materials such as paper, polyesters (e.g., spunbond), polypropylene (e.g., Meltblown), etc. The first and/or second media layers may provide structural support for the filter medium and/or may filter one or more types of particles, such as coarse or large materials (e.g., dirt). The first and/or second media layers may additionally or alternatively be constructed of a finer material for filtering finer particles/contaminants.

The third media layer (also referred to herein as the "filter layer") may be constructed of one or more fine fibers (or stiff fibers) such as paper, polyesters (e.g., spunbond), polypropylene (e.g., Meltblown), etc. In one embodiment, the filter layer (i.e., third media layer) filters finer particles or contaminants than the first and second media layers. The type and size of the particles or contaminants that the first media layer, second media layer, and/or filter layer removes may be controlled based on the fabrication of the layer. For instance, the porosity and/or permeability of the filter layer and the type of material used to construct the filter layer may be altered to filter one or more different types of particles. Other properties that may be altered to affect the filtration properties of the first, second, and/or third media layers include the fiber size, fiber orientation, and filter layer density.

The first media layer, the filter layer (i.e., third media layer), and/or the second media layer may be coupled together to form the filter medium. The surfaces of the first media layer and/or second media layer may include one or more weld points or dimples. The weld points or dimples are areas of the surface that are recessed from the otherwise relatively flat surface plane. In other words, the weld points or dimples are depressions in the surfaces of the first and second media layers. In one embodiment, the layers of the filter medium are coupled together at the weld points. For example, the layers of the filter medium may be coupled together by ultrasonically welding the layers at each of the weld points. In another embodiment, the layers of the filter medium are coupled together with one or more adhesives (e.g., hot melt glue) and the weld points or dimples are created by physically impressing the weld points or dimples with one or more punches, presses, rollers, etc.

The filter medium may be bent back on itself one or more times to form a plurality of pleats. The weld points or dimples may facilitate and/or enable fluid flow through the filter medium when the surfaces of the filter medium touch. For example, one or more of the pleats of the fluid filter may collapse, wherein the surface of one pleat touches the surface of an adjacent pleat. In such instances, the weld points or dimples may allow fluid to pass through or flow between the collapsed pleats. The weld points or dimples may facilitate and/or enable fluid flow between filter pleats by providing fluid flow tunnels between pleats that have completely collapsed. Further, one or more weld points or dimples may overlap with a weld point or dimple on an adjacent surface of the filter medium to further increase the fluid flow through the filter medium when adjacent surfaces touch. The weld points or dimples may create channels or pathways between the media surfaces when the media surfaces touch (e.g., when pleats collapse). The weld points or dimples may reduce and/or eliminate the need for separators to be used to separate individual pleats in the filter medium. In one embodiment, the filter medium does not include any pleat separators. These and other advantages of the present invention will become more apparent with reference to the figures.

FIG. 1A illustrates a fluid filter product that includes a container 102, a filter medium 104, and a cap 106. The fluid filter product illustrated in FIG. 1A is similar to filter products used in engines (e.g., cars, trucks, boats, tractors, etc.) or industrial equipment (e.g., compressors, hydraulics, vacuums, HVAC systems, etc.) to filter one or more fluids, such as oil, gas, transmission fluid, etc. The container 102 may be cylindrical in shape or any other shape (e.g., rectangular 112) to meet the needs of the filter application. For example, a cylindrical container may have an interior area or chamber in which the filter medium 104 is positioned when the filter product is assembled. The container 102 may also have an open end and a closed end. The filter medium 104 may also be cylindrical in shape so that the filter medium 104 and container 102 may be axially aligned. The filter medium 104 may include a plurality of pleats.

The cap 106 may be circular in shape and may couple with the container 102 to allow fluid to pass into and out of the filter product. For example, the cap 106 may have one or more radially located apertures that allow fluid to enter the container 102 (e.g., FIG. 1A illustrates the cap having 9 radially located apertures). The cap 106 may also have a centrally located aperture that allows fluid to exit the container 102. The filter medium 104 may be positioned in the container 102 so that any fluid that enters the container 102 through the radially located apertures is forced to pass through the filter medium 104 before exiting the container 102 through the centrally located aperture. The container 102 and/or cap 106 may be threaded so that the filter product may be threadably coupled with an engine or industrial equipment to filter one or more fluids. In one embodiment, the filter product is constructed so that the container 102, filter medium 104, and cap 106 may be removed from the engine and discarded during replacement of the filter product. In another embodiment, the filter product is constructed so that the filter medium 104 may be removed from the container 102 so that the filter medium 104 may be replaced without replacing the container 102 and/or cap 106.

Figure 1B:
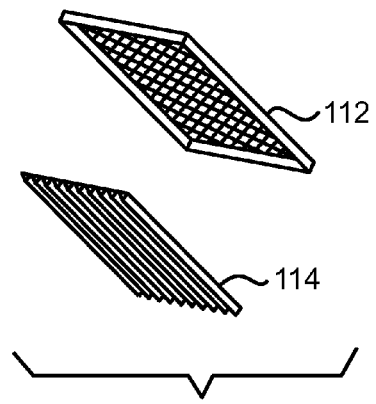
FIG. 1B is a schematic perspective view of a fluid filter product including a container and a filter medium according to another embodiment of the present invention.

FIG. 1B illustrates a fluid filter product that includes a container 112 and a filter medium 114. The fluid filter product illustrated in FIG. 1B is similar to filter products used in engines (e.g., cars, trucks, boats, tractors, etc.) or industrial equipment (e.g., compressors, vacuums, HVAC systems, etc.) to filter one or more fluids, such as air or any other gas, although the filter product may also be used to filter one or more liquids. The container 112 may be roughly rectangular in shape and may be sized so that the filter medium 114 may be positioned within the container 112. The container 112 may also include a screen or mesh or some other support that provides structural support to the assembled fluid filter product. The filter medium 114 may also be roughly rectangular in shape to correspond with the shape of the container 112. The filter medium 114 may also include a plurality of pleats. The container 112 and filter medium 114 may be positioned in the path of a fluid, such as the path of air or oil, so that the fluid is forced to pass through the filter medium 114. As the fluid passes through the filter medium 114, one or more particles or contaminants may be removed from the fluid.

Figure 2:
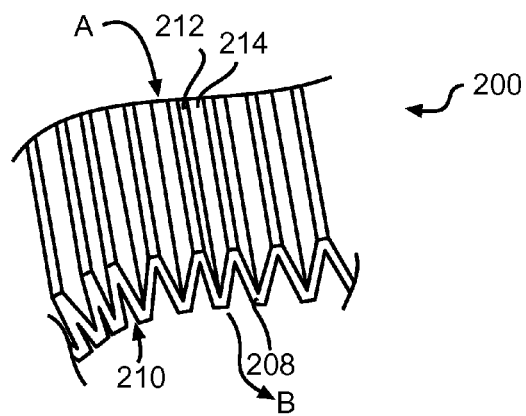
FIG. 2 is a perspective view of a filter medium illustrating the flow of a fluid through the filter medium and further illustrating a collapsed pleat according to one embodiment of the present invention.

FIG. 2 illustrates an enlarged view of a filter medium 200. The filter medium 200 includes a plurality of pleats 208 that may be formed by folding the filter medium 200 back on itself one or more times. Each of the plurality of pleats generally extends longitudinally along the entire length of the filter medium 200, although other configurations are possible. A portion of the surfaces of adjacent pleats essentially face each other. For example, element 212 shows a portion of the surface of one pleat that roughly faces a portion of the surface 214 of an adjacent pleat. FIG. 2 also shows the path that a fluid may travel through the filter medium 200. The arrow corresponding to element A indicates the flow of a fluid on the upstream side of the filter medium 200, or in other words, the flow of a fluid on the side of the filter medium that a fluid first encounters. Upon reaching the filter medium, the fluid may pass through any of the pleats. The arrow corresponding with element B indicates the flow of the fluid on the downstream side of the filter medium 200, or in other words, the flow of the fluid on the side of the filter medium that the fluid encounters upon exiting the filter medium.

Normally, a pressure differential or pressure drop exists across the filter medium 200, which drives fluid flow through the filter medium. The pressure differential may depend on the type of fluid being filtered, the size of the particle being filtered, the saturation of the filter medium with filtered particles or contaminants, the rated removal efficiency of the media, etc. In some instances, adjacent pleats of the filter medium 200 may collapse as shown by element 210. Pleat collapsing may be due to the pressure differential (e.g., the pressure differential may force adjacent pleats together) and/or due to prolonged use of the filter medium 200 (e.g., the stiffness and rigidity of the filter medium may decrease with time). When the pleats collapse, adjacent surfaces of the filter medium 200 may touch (e.g., surface 212 may touch surface 214). For example, element 210 shows three adjacent pleats collapsed so that the surfaces of each of the adjacent pleats touch. Collapsed pleats greatly restrict or eliminate fluid flow through the collapsed area and thus, may adversely affect the permeability of the filter medium 200. Pleat collapsing may also cause an increase in the pressure differential across the filter medium 200, which may result in further pleat collapsing.

Figure 3:
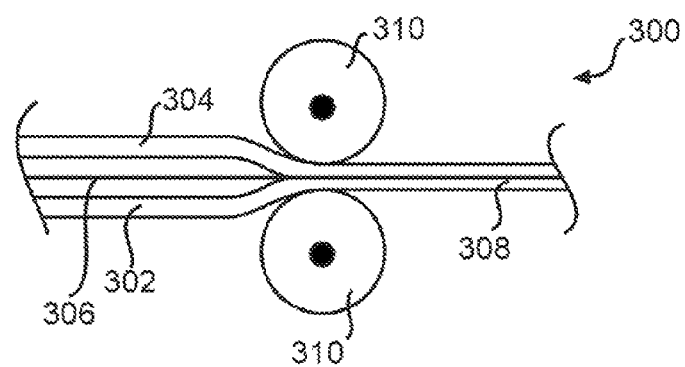
FIG. 3 is a side view of a process for manufacturing a filter medium according to one embodiment of the present invention.

FIG. 3 illustrates a process 300 that may be used to manufacture a filter medium 308. Specifically, the figure illustrates laminating one or more layers to form the filter medium 308. The various layers that form the filter medium 308 may include a first media layer 302, a second media layer 304, and a filter layer 306 disposed between the first media layer 302 and the second media layer 304. The first and second media layer, 302 and 304, may be constructed of the same material, which may include a stiff or rigid material such as spunbond polyester. The stiff or rigid first and second media layers, 302 and 304, may provide support for the filter medium 308 so as to reduce or eliminate the need for a stiff support or backing material such as nylon or wire mesh. The stiff or rigid material may help reduce pleat collapsing over the life of the filter medium. In addition, the first and second media layer, 302 and 304, may provide a loading layer for a first particle type (e.g., dirt loading layer). The filter layer 306 may be constructed from fine fibers, such as those described above (e.g., Meltblown, Spunbond, etc.) or any polymer suitable for the application (e.g., PET, PBT, PP, etc.), and may filter a second finer particle type (e.g., dust particles, metal filings, etc.). The type of fiber used and/or the construction of the filter layer may depend on the type and/or size of the particle to be filtered. For example the porosity of the filter layer 306 and/or the permeability of the filter layer may be altered by the type of fiber used and/or by the configuration of the fibers (e.g., smaller diameter, tighter fiber packing, etc.).

The various layers of the filter medium 308 (e.g., the first media layer 302, the filter layer 306, and the second media layer 304), may be pressed or laminated together through one or more rollers 310. For example, an adhesive (not shown), such as a hot melt or contact adhesive, may be applied to the various layers to couple the layers together. One or more of the rollers may impress or imprint a pattern on one or more surfaces of the filter medium 308 to create the weld points or dimples. For example, one or more of the rollers may include a plurality of small hemispherical or semi-hemispherical raised areas that impress a negative image of the rollers onto the surface of the first and/or second media layers, 302 and 304, as layers are being pressed or laminated together. The rollers may impress or imprint other shapes as well (e.g., rectangular, octagonal, etc.). The impressions of the rollers may cause the filter medium 308 to couple at each of the weld points or dimples, for example through the use of a contact adhesive.

Although FIG. 3 illustrates the filter medium 300 including a first media layer 302, a second media layer 304, and a third media layer (i.e., the filter layer 306), it should be realized that the filter medium 300 may include more or less layers than this. For example, the filter medium 300 may include only first and second media layers, 302 and 304, which may be configured of stiff or fine fibers depending on the desired application (e.g., first media layer 302 may include rigid fibers to provide structural support while second media layer 304 includes fine fibers for filtering fine particles). Likewise, the filter medium 300 may include four media layers, five media layers, or more depending on the desired application.

Figure 4:
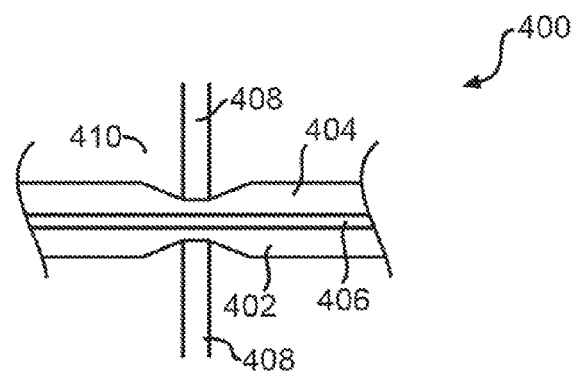
FIG. 4 is a side view of a process for coupling the various layers of a filter medium according to one embodiment of the present invention.

FIG. 4 illustrates a process 400 that may be employed to couple the various layers of the filter medium together. According to one embodiment, the process 400 may be used in addition to or in replacement of the process 300 illustrated in FIG. 3. According to another embodiment, only the process 300 is used. FIG. 4 illustrates the various layers of the filter medium being coupled together at a weld point or dimple 410. The weld points or dimples may be recessed from the otherwise flat or small outer surface due the coupling process. The various layers may include a first media layer 402, a second media layer 404, and a filter layer 406 disposed between the first and second media layers, 402 and 404. The layers may be coupled together using one or more manufacturing processes that may include one or more punches, presses, anvils, electrodes, etc. For example, the layers may be ultrasonically welded, or simply sonically welded, together. To sonically weld the layers, one or more sonic welding members 408 may be used. The sonic welding members 408 may include a nest (anvil) and a sonotrode (horn) that locally apply high-frequency unltrasonic acoustic vibrations to the various layers at the weld point or dimple 410. The weld points or dimples 410 may be recessed due to the sonic welding process. In addition, sonically welding the layers together may eliminate the need for adhesives to be used to bond the layers.

Although FIG. 4 illustrates the filter medium including weld points or dimples on both outer surfaces, it should be realized that the filter medium may include weld points or dimples on one surface only. For example, a single weld member 408 may be pressed against one surface of the filter medium while the opposite surface rests on a flat plate or table. Likewise, a dimpled roller may be rolled along one surface while the opposite surface rests on a flat plate or table. Such process may result in weld points or dimples only on a single surface of the filter medium. The single surface dimples or weld points may provide the fluid passage functions described herein.

Figure 5:
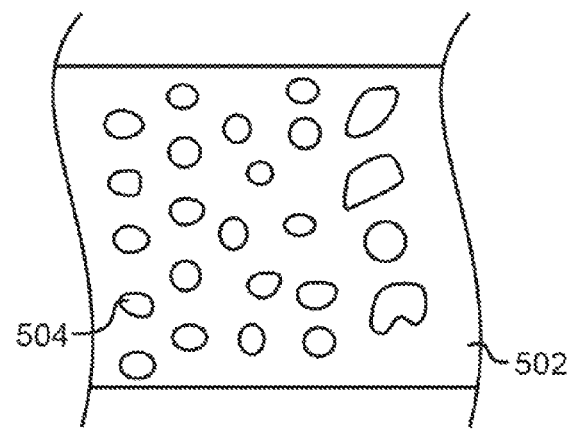
FIG. 5 is top view of a filter medium illustrating a plurality of spaced apart weld points on a surface of the filter medium according to one embodiment of the present invention.

FIG. 5 illustrates a surface of a filter medium 502 having a plurality of spaced apart weld points or dimples 504. The spaced apart weld points or dimples 504 may be spaced and oriented in an orderly way, as shown on the left side of the surface, or the spacing and orientation may be more random, as shown on the right side of the surface. Likewise, the weld points or dimples 504 may be circular and/or roughly hemispherical, as shown on the left side of the surface, or may exhibit other shapes, such as an oval, rectangle, etc., as shown on the right side of the surface. The opposite surface of the filter medium 502 may also have a plurality of weld points or dimples where each weld point or dimple corresponds to a weld point or dimple 504 on the surface shown. In instances where the filter medium is coupled at the weld points, the weld points are generally spaced and oriented so that the weld points provide sufficient adhesion for the filter medium 502. In one embodiment, the weld points or dimples 504 comprise roughly 5-25% of the surface area of the filter medium 502. In another embodiment, the weld points or dimples 504 comprise roughly 5-10% of the filter medium's surface area, with a specific embodiment comprising approximately 8%.

Figure 6:
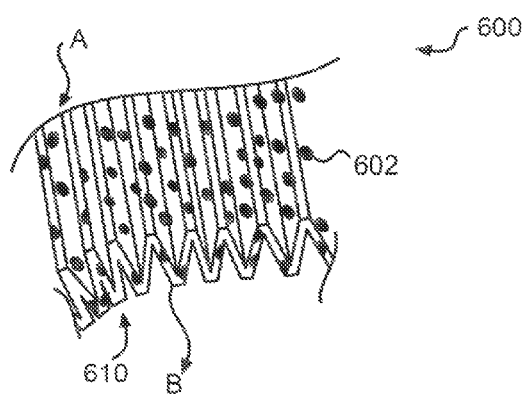
FIG. 6 is a perspective view of a filter medium including a plurality of spaced apart weld points, wherein the figure illustrates the flow of a fluid through the filter medium according to one embodiment of the present invention.

FIG. 6 illustrates a pleated filter medium 600 that includes a plurality of spaced apart weld points or dimples 602. The pleated filter medium 600 shows a plurality of pleats that have collapsed 610 so that adjacent surfaces of the pleats touch. The plurality of weld points or dimples 602 may enable fluid flow through the collapsed pleats 610 even though the surfaces of the pleats touch. The arrows corresponding to elements A and B illustrate the flow of a fluid through the collapsed pleats 610 from an upstream side of the filter medium 600 to a down stream side of the filter medium. The plurality of weld points or dimples 602 may create fluid pathways through the filter medium 600 when adjacent surfaces of the filter medium touch (e.g., when the pleats collapse). For example, the plurality of weld points or dimples 602 may create pockets throughout the collapsed portion of the filter medium 600. The pockets may create areas of high and low spots that may keep the filter medium 600 form completely folding against itself (e.g., may keep adjacent pleats from completely collapsing). In other words, the high and low spots may keep adjacent surfaces from completely touching.

To enable fluid flow through collapsed portions of the filter medium 600, the surface or surfaces of the filter medium should comprise a sufficient number and spacing of weld points or dimples 602. As mentioned previously, in one embodiment, the weld points or dimples 602 comprise roughly 5-25% of the surface area of the filter medium 600, while in another embodiment the weld points or dimples comprise roughly 5-10% of the surface area, with a specific embodiment comprising approximately 8%. In addition, the spacing and orientation of the weld points or dimples 602 may be such that one or more dimples offset or overlap with one or more other dimples so that additional space is created in the collapsed surfaces. Further, in one embodiment, the filter medium 600 may include one or more separators applied between one or more pleats to facilitate in keeping adjacent pleats separated. In another embodiment, the filter medium 600 does not include any separators.

Figure 7A:
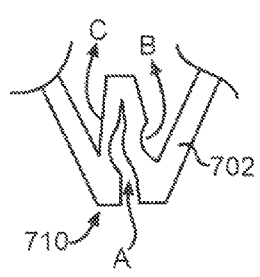
FIG. 7A is a side view of a filter medium including a plurality of spaced apart weld points and a collapsed pleat, wherein the figure illustrates the flow of a fluid through the collapsed pleat of the filter medium according to one embodiment of the present invention.
Figure 7B:
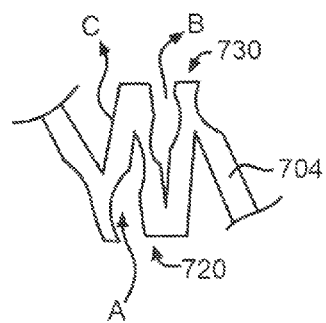
FIG. 7B is a side view of a filter medium including a plurality of spaced apart weld points and a plurality of collapsed pleats, wherein the figure illustrates the flow of a fluid through the plurality of collapsed pleats according to one embodiment of the present invention.

FIGS. 7A and 7B further illustrate fluid pathways that may be created from the weld points or dimples when adjacent surfaces of the filter medium touch (e.g., when adjacent pleats collapse). For simplicity, FIGS. 7A and 7B illustrate only a few pleats collapsed, although it should be realized that the filter medium may include any number of collapsed pleats. FIG. 7A shows a filter medium 702 having an area 710 on the upstream side of the filter medium 702 where adjacent pleats have collapsed. Adjacent surfaces of the collapsed pleats do not fully touch or contact each other due to the weld points or dimples in the surface of the filter medium 702. The weld points or dimples create pockets in the collapsed area 710 that provide fluid pathways for the filtered fluid. In addition, when adjacent surfaces of the filter medium 702 touch (e.g., when pleats collapse), one or more of the weld points or dimples on a first surface may overlap with one or more weld points or dimples on the adjacent surface, as shown in FIGS. 7A and 7B. The overlapping dimples may enlarge or expand the fluid pathway that is created through the collapsed area of the filter medium.

The arrow corresponding with element A illustrates that a fluid may flow into one or more pockets created by the weld points or dimples on an upstream side of the filter medium 702. The fluid that enters the pockets may then pass through and exit the filter medium 702. The arrows corresponding with elements B and C illustrate possible routes that the fluid may take through the filter medium 702. For example, the fluid may enter the pocket as illustrated by the arrow corresponding to element A, pass through a weld point or dimple on the upstream side of the filter medium 702, and exit through a weld point or dimple on the down stream side of the filter medium as illustrated by the arrow corresponding to element B. Alternatively, the fluid may enter the pocket, pass through a dimpled or un-dimpled surface on the upstream side, and exit through an un-dimpled surface on the downstream side as illustrated by the arrow corresponding to element C.

FIG. 7B shows a filter medium 704 having an area 720 on the upstream side of the filter medium 704 where adjacent pleats have collapsed and an area 730 on the downstream side of the filter medium where adjacent pleats have collapsed. As in FIG. 7A, adjacent surfaces of the collapsed pleats (both upstream side and downstream side) do not fully touch or contact each other due to the weld points or dimples in the filter medium 704. The weld points or dimples create a plurality of pockets in the collapsed areas 720 and 730 that prevent the surfaces from fully touching and that provide fluid pathways for the filtered fluid.

The arrow corresponding with element A illustrates that the fluid may flow into one or more pockets on the upstream side of the filter medium 704. The arrows corresponding to elements B and C illustrate that the fluid may then flow through the filter medium 704 and exit through the collapsed pleats 730 on the downstream side of the filter medium 704 (shown by the arrow corresponding to element B) and/or through an un-collapsed area on the downstream side of the filter medium (shown by the arrow corresponding with element C). The pockets created in the collapsed area 730 on the downstream side of the filter medium 704 may facilitate fluid flow through the collapsed area. Thus, due to the weld points or dimples, fluid flow may be maintained through a collapsed area even when pleats have collapsed on both the upstream and downstream side of the filter medium 704. In addition, the weld points or dimples may enable fluid flow through the collapsed areas regardless of the number of pleats that have collapsed on either or both the upstream side and downstream side of the filter medium 704.

Figure 8:
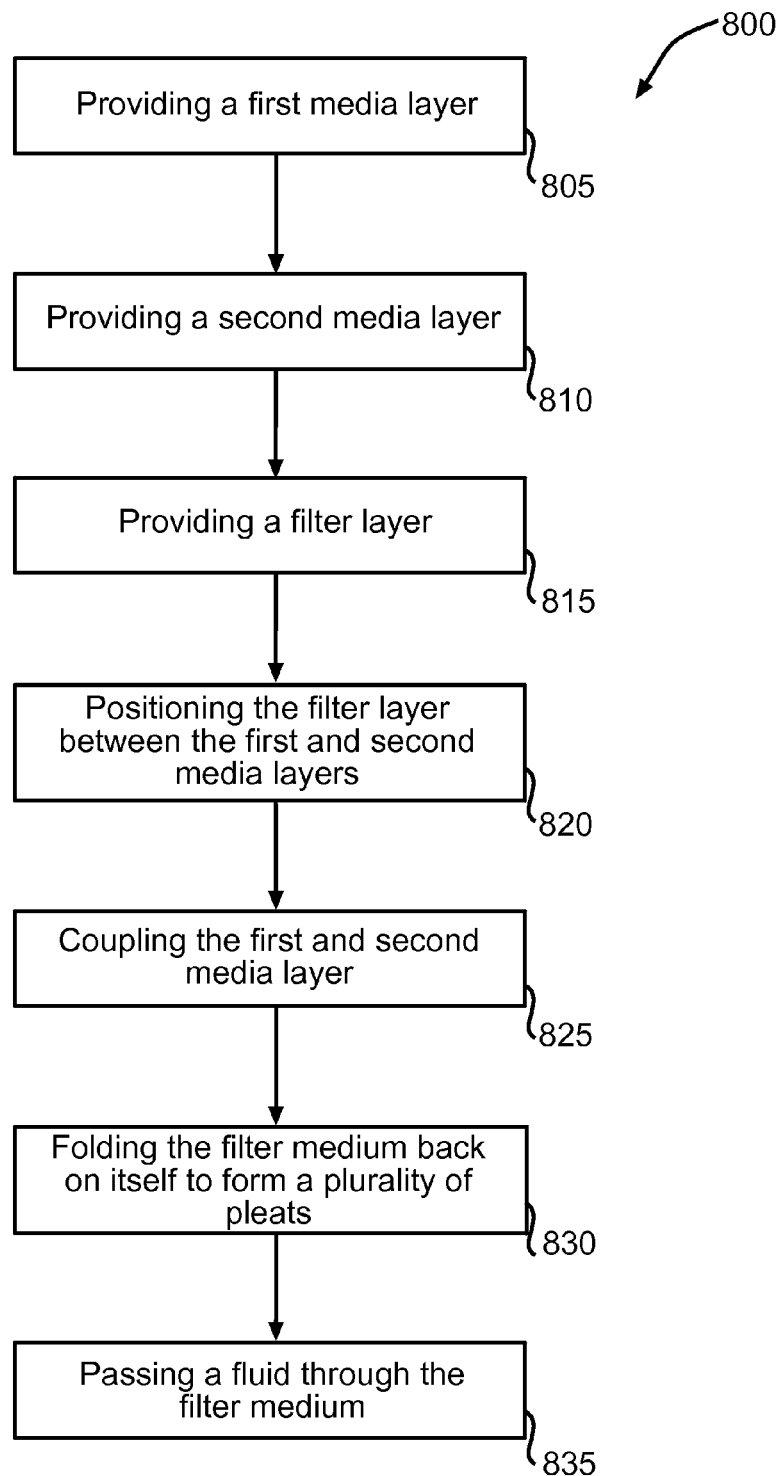
FIG. 8 is a flow diagram illustrating a method for making a filter medium according to one embodiment of the present invention.

FIG. 8 illustrates a method 800 for making a filter medium. At block 805, a first media layer may be provided. At block 810 a second media layer may be provided. At block 815, a filter layer may be provided. At block 820, the filter layer may be positioned between the first media layer and the second media layer. Blocks 815 and 820 are optional when the filter medium only includes two layers. Likewise, block 815 and/or 820 may be repeated when additional layers are used. At block 825, the first media layer, the second media layer, and/or the filter layer may be coupled together to form the filter medium. The filter medium may include dimple or weld points as described herein. At block 830, the filter medium may folded back on itself to from a plurality of pleats in the filter medium. At block 835, a fluid may be passed through the filter medium to remove one or more particles or contaminants. The filter medium, may further be coupled with a container or housing, such as a cylindrical container having an interior that houses the filter medium.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A fluid filter media comprising:
   a first media layer;
   a second media layer;
   a filter layer disposed between the first media layer and the second media layer; and
   a plurality of spaced apart weld points that couple the first media layer, the filter layer, and the second media layer together to form the fluid filter media, the fluid filter media having a first surface and a second surface opposite the first surface, wherein:
   all of the weld points distort the surface of the first media layer and the second media layer such that each weld point includes an inward depression of the first surface that is aligned with an inward depression of the second surface wherein each weld point and depression forms a dimple on the first and second media layers;

the fluid filter media is folded back on itself to form a plurality of pleats, wherein each pleat includes a surface that faces a corresponding surface of an adjacent pleat;

the inward depressions of the first and second surfaces permit fluid flow through the fluid filter media when one or more pleats collapse via contact between facing surfaces of adjacent pleats; and the fluid filter media does not include a pleat separator between facing surfaces of adjacent pleats to prevent the pleats from collapsing.

2. The fluid filter media of claim 1, wherein the dimpled first media layer and second media layer create fluid pathways through the fluid filter media when the one or more pleats collapse.

3. The fluid filter media of claim 1, wherein when the one or more pleats collapse, one or more inward depressions of a first pleat overlap with one or more inward depressions of a second pleat that is contacting the first pleat such that a fluid pathway is maintained through the first and second pleats via the overlapping inward depressions.

4. The fluid filter media of claim 1, wherein each of the plurality of spaced apart weld points comprises an ultrasonic weld.

5. A filter medium comprising:
a first media layer;
a second media layer; and
a plurality of spaced apart weld points that couple the first media layer and the second media layer together to form the filter medium, the filter medium having a first surface and a second surface opposite the first surface, wherein:
all of the weld points distort the surface of the first media layer and the second media layer such that each weld point includes an inward depression of the first surface that is aligned with an inward depression of the second surface;
the filter medium is folded back on itself to form a plurality of pleats, wherein each pleat includes a surface that faces a corresponding surface of an adjacent pleat;
the inward depressions permit fluid flow through the filter medium when one or more pleats collapse via contact between facing surfaces of adjacent pleats; and
the filter medium does not include a pleat separator to prevent the pleats from collapsing.

6. The filter medium of claim 5, further comprising a third media layer disposed between the first media layer and the second media layer.

7. The filter medium of claim 5, further comprising a container having an open end, a closed end, and an interior, wherein the filter medium and the container are assembled with the filter medium positioned within the interior of the container.

8. The filter medium of claim 7, wherein the container is generally cylindrical and the filter medium is generally cylindrical, and wherein the cylindrical filter medium and cylindrical container are assembled in an axially aligned relationship with the cylindrical filter medium positioned within the interior of the cylindrical container.

9. The filter medium of claim 5, wherein the first media layer and the second media layer are dimpled at each of the plurality of weld points.

10. The filter medium of claim 9, wherein the dimpled first media layer and second media layer create fluid pathways through the filter medium when the one or more pleats collapse.

11. The filter medium of claim 9, wherein when the one or more pleats collapse, one or more dimples of a first pleat overlap with one or more dimples of a second pleat that is contacting the first pleat such that a fluid pathway is maintained through the first and second pleats via the overlapping dimples.

12. A method of making a filter medium that removes one or more particles from a fluid passed through the filter medium, the method comprising:
providing a first media layer;
providing a second media layer;
providing a filter layer;
positioning the filter layer between the first media layer and the second media layer;
coupling the first media layer with the second media layer by forming a plurality of spaced apart weld points, the coupled first media layer and second media layer having a first surface and a second surface opposite the first surface, wherein all of the weld points distort the first surface and the second surface such that each weld point includes an inward depression of the first surface that is aligned with an inward depression of the second surface, and
folding the filter medium back on itself to form a plurality of pleats in the coupled first media layer and second media layer, wherein each pleat includes a surface that faces a corresponding surface of an adjacent pleat and is free of a pleat separator between said facing surfaces, and wherein the inward depressions permit fluid flow through the filter medium when one or more pleats collapse via contact between facing surfaces of adjacent pleats.

13. The method as in claim 12, wherein the filter medium comprises a hollow cylindrical shape with the first media layer on the exterior of the cylindrical filter medium and the second media layer on the interior of the cylindrical filter medium, and wherein the method further comprises:
providing a cylindrical container having an interior, an open end, and a closed end; and
assembling the cylindrical container with the cylindrical filter medium by axially aligning the cylindrical container and the cylindrical filter medium and by positioning the cylindrical filter medium within the interior of the cylindrical container.

14. The method as in claim 12, further comprising flowing a fluid through the filter medium to remove one or more particles from the fluid.

15. The method as in claim 14, wherein the first media layer removes a first particle type from the fluid and the filter layer removes a second particle type from the fluid, wherein the first particle type is different than the second particle type.

16. The method as in claim 12, wherein each of the plurality of spaced apart weld points comprises an ultrasonic weld that couples the first media layer with the second media layer.

17. The method as in claim 12, wherein the inward depressions of the first media layer and second media layer create fluid pathways through which the fluid passes when the one or more pleats collapse.

18. A method of filtering a fluid, the method comprising:
providing a filter media comprising:
a first media layer;
a second media layer; and
a plurality of spaced apart weld points that couple the first media layer and the second media layer together to form the filter media, the filter media having a first surface and a second surface opposite the first surface, wherein:
all of the weld points distort the surface of the first media layer and the second media layer such each weld point includes an inward depression of the first surface that is aligned with an inward depression of the second surface;

the filter media is folded back on itself to form a plurality of pleats, wherein each pleat includes a surface that faces a corresponding surface of an adjacent pleat;

the depressions permit fluid flow through the filter media when one or more pleats collapse via contact between facing surfaces of adjacent pleats; and the filter media does not include a pleat separator to prevent the pleats from collapsing; and passing the fluid through the filter media to remove one or more particles from the fluid.

\* \* \* \* \*